(12) United States Patent
Hatch et al.

(10) Patent No.: US 9,791,856 B2
(45) Date of Patent: Oct. 17, 2017

(54) FAULT FREQUENCY SET DETECTION SYSTEM AND METHOD

(71) Applicant: General Electric Company, Schenectady, NY (US)

(72) Inventors: Charles Terrance Hatch, Gardnerville, NV (US); Jesse Lewis Hanna, Gardnerville, NV (US); Shekhar Raghuvir Sashital, Mumbai (IN); Dhruti Gishu Pillai, Thane (West) (IN); Yash Vijay Churi, Mumbai (IN)

(73) Assignee: General Electric Company, Schenectady, NY (US)

( * ) Notice: Subject to any disclaimer, the term of this patent is extended or adjusted under 35 U.S.C. 154(b) by 671 days.

(21) Appl. No.: 13/750,422

(22) Filed: Jan. 25, 2013

(65) Prior Publication Data

US 2014/0214363 A1    Jul. 31, 2014

(51) Int. Cl.
  G06F 17/18     (2006.01)
  G06F 17/00     (2006.01)
  G05B 23/02     (2006.01)
  G05B 19/4065   (2006.01)

(52) U.S. Cl.
  CPC ..... *G05B 23/0235* (2013.01); *G05B 19/4065* (2013.01); *G05B 2219/37434* (2013.01)

(58) Field of Classification Search
  CPC ....... G01H 1/003; G01H 1/00; G01M 13/045; G01N 2291/2696; G06F 11/30; G06F 17/30; G06F 19/00; G06F 17/00
  See application file for complete search history.

(56) References Cited

U.S. PATENT DOCUMENTS

| | | |
|---|---|---|
| 5,984,178 A | 11/1999 | Gill et al. |
| 6,279,826 B1 | 8/2001 | Gill et al. |
| 6,768,975 B1 | 7/2004 | Gill et al. |
| 7,036,048 B1 | 4/2006 | Gill et al. |
| 7,099,461 B2 | 8/2006 | Mullins et al. |
| 7,246,290 B1 | 7/2007 | Green et al. |
| 7,366,646 B1 | 4/2008 | Gill et al. |
| 7,401,264 B1 | 7/2008 | Gill et al. |
| 7,406,630 B1 | 7/2008 | Gill et al. |
| 7,641,107 B1 | 1/2010 | Gill et al. |
| 2002/0139191 A1* | 10/2002 | Hedeen et al. ................. 73/593 |
| 2004/0093516 A1 | 5/2004 | Hornbeek et al. |
| 2009/0097397 A1 | 4/2009 | Moreira et al. |

(Continued)

OTHER PUBLICATIONS

Felten, Understanding Bearing Vibration Frequencies, Sep. 2003, easa, p. 1-3.*

*Primary Examiner* — John Breene
*Assistant Examiner* — Mohammad Islam
(74) *Attorney, Agent, or Firm* — Fletcher Yoder, P.C.

(57) ABSTRACT

Systems and methods are provided for monitoring operating machinery to identify fault frequency sets for consumable components used in the machinery. Data associated with characteristic behavior of the machinery being monitored is acquired and analyzed, comparing known vendor information regarding fault frequencies for specified components to vibration frequencies observed in the machine in service. The systems and methods described herein enable an operator to identify and confirm critical information such as the location of and/or vendor identity for components exhibiting fault vibration behavior.

16 Claims, 4 Drawing Sheets

(56) References Cited

U.S. PATENT DOCUMENTS

| | | | |
|---|---|---|---|
| 2009/0292505 A1* | 11/2009 | Van Dyke | G01H 1/00 |
| | | | 702/184 |
| 2011/0047418 A1 | 2/2011 | Drees et al. | |
| 2011/0178977 A1 | 7/2011 | Drees | |
| 2011/0290024 A1* | 12/2011 | Lefler | G01H 1/003 |
| | | | 73/579 |
| 2012/0022700 A1 | 1/2012 | Drees et al. | |
| 2012/0259583 A1 | 10/2012 | Noboa et al. | |
| 2012/0316796 A1* | 12/2012 | Goodman | G01M 13/045 |
| | | | 702/39 |
| 2013/0096848 A1* | 4/2013 | Hatch | G01M 13/045 |
| | | | 702/39 |
| 2014/0257714 A1* | 9/2014 | Kiviniemi et al. | 702/33 |

* cited by examiner

| Component | Cage | ORBP | IRBP | BS | 2xBS |
|---|---|---|---|---|---|
| Bearing 1 Type (Vendor) 1 | 0.39 | 5.85 | 9.15 | 2.16 | 4.33 |
| Type (Vendor) 2 | 0.39 | 7.82 | 12.18 | 2.18 | 4.37 |
| ⋮ Type (Vendor) n | x.xx | x.xx | x.xx | x.xx | x.xx |
| Bearing 2 Type (Vendor) X | ⋮ | ⋮ | ⋮ | ⋮ | ⋮ |
| Bearing M Type (Vendor) Y | x.xx | x.xx | x.xx | x.xx | x.xx |

400

FAULT FREQUENCY SET DETECTION SYSTEM AND METHOD

BACKGROUND OF THE INVENTION

The present disclosure relates to monitoring machinery or other apparatus during operation, and more specifically, to systems used to detect fault frequency sets for components to enable failing components to be identified.

Some machines, such as machines incorporating rotating elements, often include bearings or other components, which, due to the heavy use and operating conditions of the machines, are often replaced during normal operation of the machines. During maintenance servicing, bearings from one vendor are often replaced with bearings from a different vendor. Thus, after maintenance sessions, similar or identically-configured bearings from more than one vendor may be in service in any particular machine. For example, complex rotating machinery, such as the gearbox of a wind-powered turbine, may incorporate numerous rolling elements or bearing sets. Typically, the bearing sets include at least two sets of rolling bearings and at least one thrust bearing. For each such rolling element, the manufacturer of the rotating machinery may have qualified a number of vendors to supply bearings for a single machine. Therefore, it may be common for a single machine to include bearings sourced from three or more vendors.

Accordingly, in order for a machine owner/operator to efficiently and promptly service and maintain a machine, the owner/operator must be able to detect when bearings or rotating elements are exhibiting failure characteristics, and be able to promptly identify the location of the failing components. Typically, sensors (for example, vibration accelerometers) gather data from a machine either continuously or at specified intervals. If the output of the various sensors is representative of excessive vibration amplitudes at predefined frequencies, at least one bearing in the machine may be failing.

Each bearing vendor designs bearings to meet particular load carrying and external dimensional requirements. Because the bearing design problem can be solved different ways, different vendors can produce functionally similar bearings with similar or different inner race, outer race, and element dimensions. Different race and element dimensions will produce a different set of bearing fault frequencies. Typically, a vibration fault frequency is expressed as a multiple of the rotational speed of the shaft or other rotating element associated with a specific bearing set. Vibration fault frequency modes are governed by the bearing geometry used by each respective vendor. Each bearing, regardless of its configuration, location in a machine, or vendor, exhibits vibrations in at least five (5) modes: cage; outer race ball pass (ORBP); inner race ball pass (IRBP), ball (or element) spin (BS); and twice (2×) ball (or element) spin (2× BS). The different vibration fault frequency modes can be identified based on the frequency ranges in which they occur. For a given bearing, fault or failure in one or more of such modes will be indicated by increased vibration amplitudes at predefined frequencies.

Previously, in order for a machine owner/operator to promptly respond to a detected fault/failure situation, the machine owner/operator had to maintain records specific to each bearing or rolling element in each machine, including its fault frequency, and location in the machine. Such records would require updating each time a bearing was replaced or when new bearings are added. However, maintaining such detailed records can be cumbersome, and may be prone to error.

BRIEF DESCRIPTION OF THE INVENTION

In an aspect, a system for use in identifying a fault frequency set associated with a machine is provided. The system includes a processor and a control system. The control system is configured to collect data from a sensor coupled to the machine, wherein the data is representative of at least one operating characteristic associated with at least one consumable component of the machine. The control system is further configured to calculate spectra corresponding to the collected data representative of the detected characteristic. The control system is further configured to compare successive sets of vendor fault frequency ranges stored in the processor to the calculated spectra, wherein the vendor fault frequency ranges are associated with vendor fault frequencies for consumable components originating from each of a plurality of vendors, and wherein the vendor fault frequencies are stored in the processor. The control system is further configured to compare the data to identify at least one fault frequency set associated with the machine.

In another aspect, a method for use in identifying a fault frequency set associated with a machine is provided. The method includes collecting data from a sensor coupled to the machine, wherein the data is representative of at least one operating characteristic associated with at least one consumable component of the machine. The method also includes calculating spectra corresponding to the collected data representative of the detected characteristic. The method also includes comparing successive sets of vendor fault frequency ranges stored in a processor to the calculated spectra, wherein the vendor fault frequency ranges are associated with vendor fault frequencies for consumable components originating from each of a plurality of vendors, and wherein the vendor fault frequencies are stored in said processor. The method also includes comparing the data to identify at least one fault frequency set associated with the machine.

DETAILED DESCRIPTION OF THE INVENTION

Although specific features of various embodiments of the invention may be shown in some drawings and not in others, this is for convenience only. In accordance with the principles of the invention, any feature of a drawing may be referenced and/or claimed in combination with any feature of any other drawing.

A technical effect of the systems and methods described herein includes at least one of: (a) collecting data from a sensor coupled to the machine, wherein the data is representative of at least one operating characteristic associated with at least one consumable component of the machine; (b) calculating spectra corresponding to the collected data representative of the detected characteristic; (c) comparing successive sets of vendor fault frequency ranges stored in a processor to the calculated spectra, wherein the vendor fault frequency ranges are associated with vendor fault frequencies for consumable components originating from each of a plurality of vendors, and wherein the vendor fault frequencies are stored in said processor; (d) comparing the data to identify at least one fault frequency set associated with the machine; (e) generating sums corresponding to spectrum values falling within each respective set of vendor fault frequency ranges; (f) comparing the generated sums to determine the generated sum having the highest absolute value; (g) identifying as the probable vendor associated with the detected characteristic, the vendor associated with the generated sum having the highest value; (h) storing in the processor data corresponding to location fault frequency sets, wherein each location fault frequency set is associated with a corresponding vendor and a corresponding location within the machine; (i) generating further sums corresponding to spectrum values falling within each respective location fault frequency set; (j) comparing the generated further sums; and (k) identifying as the probable location within the machine of the source of the detected at least one operating characteristic, the location associated with the generated further sum having the highest value.

Figure 1:
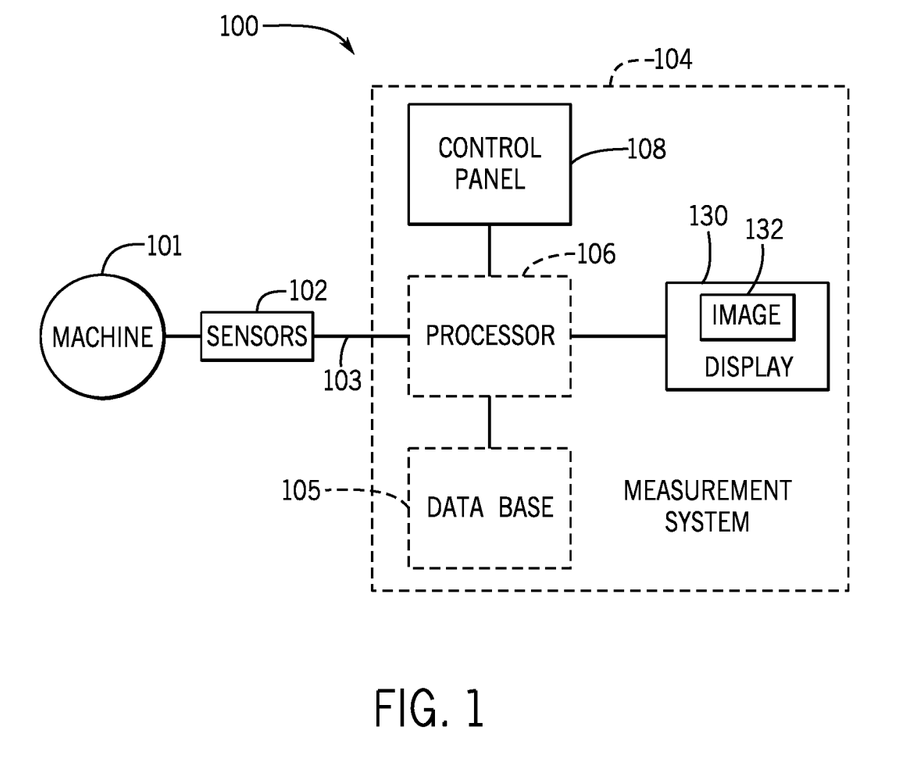
FIG. 1 is a schematic illustration of an exemplary measurement system that may be used to detect fault frequency sets.
Figure 2:
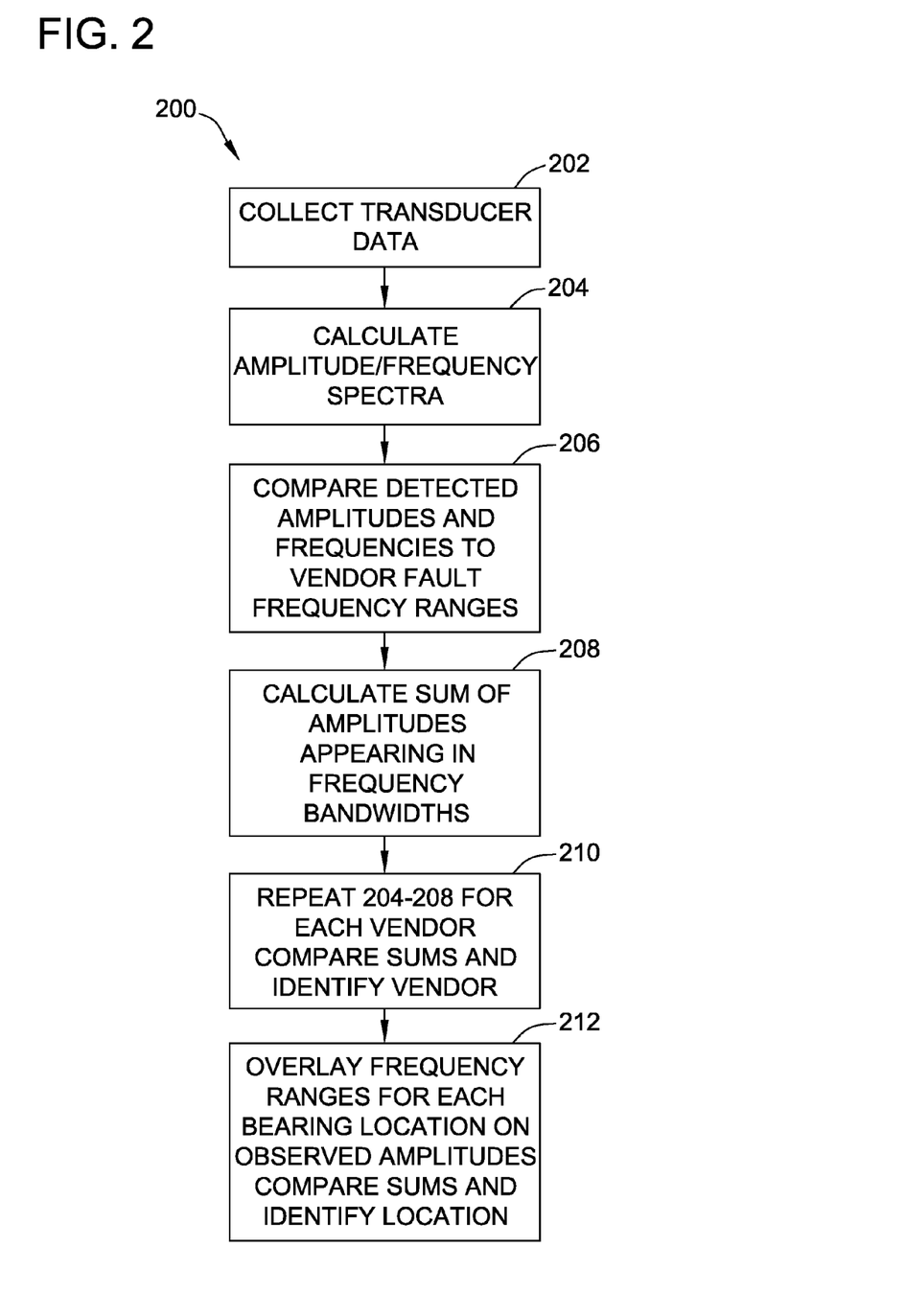
FIG. 2 is a flowchart illustrating the phases of an exemplary fault frequency set detection.

FIG. 1 is a schematic illustration of an exemplary measurement system 100 that includes a display 130. FIG. 2 is a flowchart generally illustrating the phases of an exemplary fault frequency set detection. Display 130 is incorporated into an overall equipment control system. As used herein, the term "equipment control system" includes not only systems that regulate the operation of machines, such as a machine 101, but also includes systems such as monitoring or measurement systems, such as measurement system 100.

As used herein, "machine" refers to any apparatus or device that includes one or more moving parts, wherein the apparatus or device uses components that may be consumed during normal operations, such as bearings. Vendors for such consumable components typically configure the consumable components so that they will exhibit a specific operating characteristic. For example, a bearing may be configured to exhibit an increased vibration, i.e., above a "normal" vibration magnitude exhibited during normal operating conditions, at one or more predefined frequencies, such as when the bearing is approaching the end of its useful service life or is about to fail. Different vibration frequencies may occur at different rotational speeds. Each vendor's failure characteristics are preferably distinguishable from those of other vendors. In practice, however, two different vendors' bearings having a similar configuration (that is, sized and configured for use in the same area of a particular machine) may have the same or similar fault frequencies for one or more of the five fault frequency modes described above.

In an exemplary embodiment, measurement system 100 includes one or more sensors 102, such as vibration transducers, that are coupled to machine 101 being monitored, such as a shaft or mounting structure of a rotary machine, and/or a wind turbine. Sensors 102 are likewise coupled to a display system 104 that provides a display 130. Sensors 102, as described herein, may be analog accelerometers, vibration transducers, and/or any other type of sensor appropriate for detecting a desired phenomenon. Display system 104 includes one or more processors 106 that receive, via a connection 103, which may be any suitable connection, whether hard-wired or wireless, raw signal(s) transmitted from sensor(s) 102. Typically, the analog signals transmitted from sensors 102 are digitized. Optionally, window functions and/or fast Fourier transform operations ("FFT") may be applied. The term "window functions," as used herein, refers to standardized conventional methods for processing waveforms, for example, flattening the endpoints of a run of data to zero, and/or interpolating consecutive runs of data to ensure that the endpoints of the runs of data merge smoothly, etc. Such data processing techniques are well known to those skilled in the art. If so configured, system 100 applies the window function to each collected waveform. Once processed in that manner, or if system 100 is configured not to apply the window function, system 100 performs a FFT operation to each waveform, to calculate the frequency content in a signal.

Figure 4:
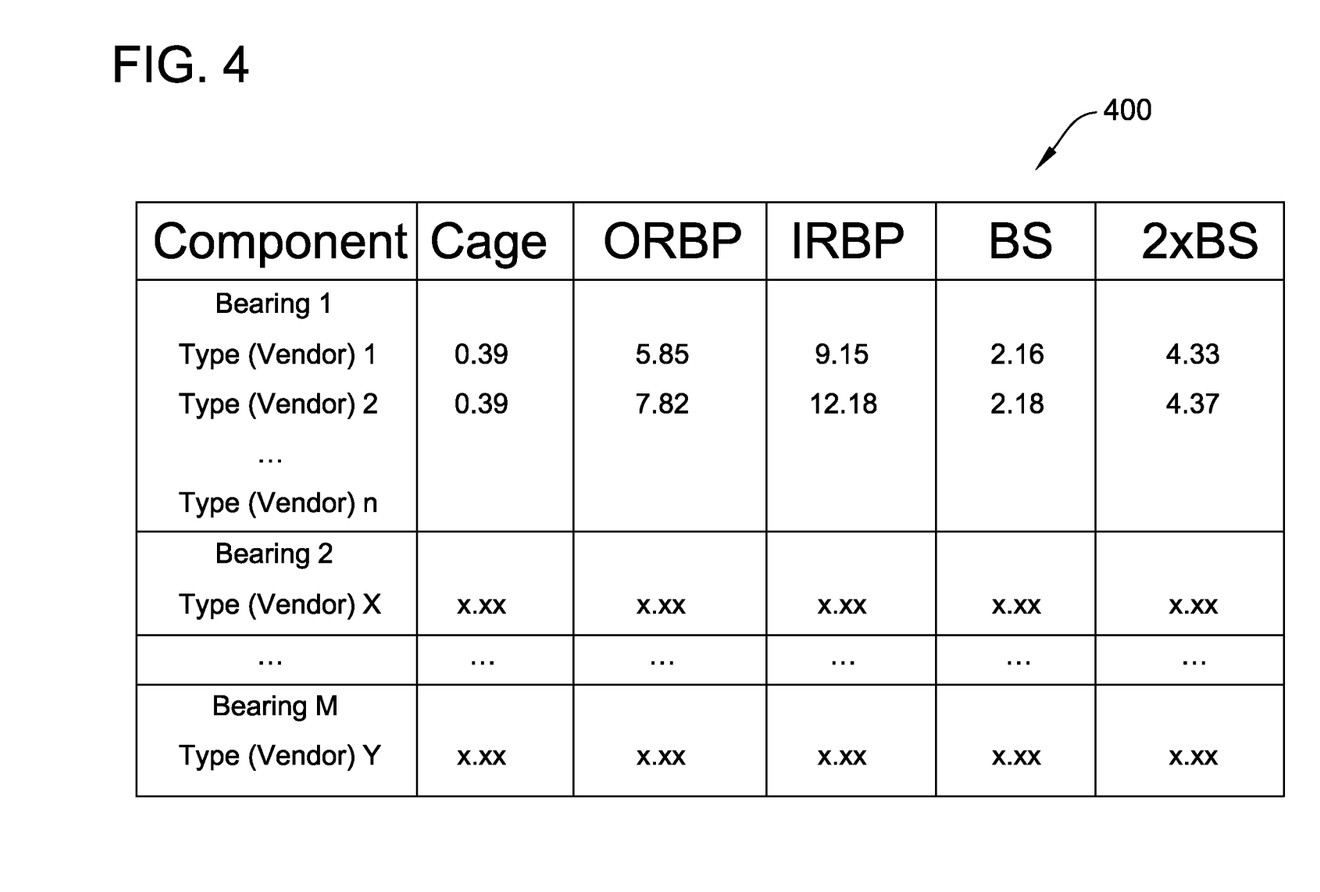
FIG. 4 is an exemplary fault frequency lookup table, illustrating principal fault frequencies referenced against bearing position and bearing vendor.

In the exemplary embodiment, control panel 108 enables a user to selectively configure the image 132 displayed on, e.g., display 130, and to select which numerical values processor(s) 106 derive from the raw signal(s) being transmitted from sensor(s) 102. Display system 104 may, for example, be a suitably programmed desktop or laptop computer, the internal processors of which serve as processor(s) 106, its keyboard functions serving as control panel 108, and the screen of the desktop or laptop computer showing display 130. Display system 104 also includes memory/database 105, that is configured to store vibration (or other) data acquired from sensor(s) 102 and historical data, such as failure/fault bearing vibration characteristics corresponding to a list of specific manufacturers. Specifically, database 105 will store one or more tables of data, such as the table shown in FIG. 4, which provides the vibration fault frequencies for various vendors' bearing types, correlated to bearing position within machine 101. Sensors 102, such as vibration transducers, indicate vibration in the form of an analog waveform. Determination of the amount of vibration is completed by calculating a feature of the waveform, such as amplitude, positive or negative peak values, and/or peak-to-peak distance.

As used herein, the term "processor" is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Measurement system 100 implements method 200 (shown in FIG. 2) to process data acquired during monitoring of machine 101. Database 105 contains fault frequency information for each vendor and bearing or other component provided by that vendor, for each bearing or roller element location that is applicable to the particular machine(s) being monitored, such as shown in table 400 of FIG. 4. Such fault frequency information is obtained from the known vendors of bearings for machine 101, and is periodically updated by the operator of machine 101 and/or by the vendors. The fault frequency information includes the fault frequencies for the five standard fault frequency modes for bearings, namely: cage; outer race ball pass ("ORBP"); inner race ball pass ("IRBP"); ball spin ("BS"); and twice (2×) ball spin ("2× BS"). Fault frequencies are frequently defined to two or three significant figures. This information is correlated in a look-up table stored in database 105, such as table 400 shown in FIG. 4, according to vendor, bearing type, and location relative to the machine being monitored. Accordingly, if the potential vendors for a particular machine are known, the locations of bearings corresponding to those vendors can be determined. Conversely, if a fault frequency is detected that corresponds to a particular bearing by a particular vendor, then the possible location (if the machine incorporates bearings from different vendors that have the same or similar fault frequencies for one or more modes) of that bearing may be determinable.

In an exemplary embodiment, method 200 is used as part of a stand-alone monitoring system. Alternatively, method 200 is implemented within a larger suite of sensor and processor apparatus and software configured to monitor and detect fault and failure conditions within a machine or fleet of machines. In practice, machine 101 may include a plurality of sensors 102 in service at different locations thereon. Typically, the analysis of data received from multiple sensors 102 is performed separately for each respective sensor 102. That is, data from separate sensors 102 are not combined. Each sensor 102 is preferably located on or in machine 101 so that the vibrations, or other phenomena that sensor 102 is assigned to detect emanate primarily from a single bearing or bearing set. In practice, each sensor 102 may detect vibrations emanating from components other than the adjacent component to which that particular sensor 102 has been assigned. However, such extraneous vibrations typically will be of significantly lower amplitude and/or in frequency regimes sufficiently differentiable from the vibrations emanating from the assigned component of interest, as to be treatable as noise, utilizing known data processing techniques.

System 100 collects 202 analog transducer waveforms transmitted from sensor 102 coupled to machine 101. Using the analog transducer waveforms, system 100 determines 204 the spectra of actual vibration amplitude values for the feature being calculated, such as vibration amplitude, across the range of vibration frequencies represented by the data transmitted from sensor 102. System 100 compares 206 the detected vibration amplitudes and frequencies to fault frequency ranges based on vendor fault frequencies stored in database 105. As used herein, a "fault frequency range" is a set of frequencies extending predefined amounts, or expansion values, above and below a "normal" frequency range centered on a predefined fault frequency value. System 100 then determines 208 the sums of the detected amplitudes. System 100 repeats 210 steps 204-208 with respect to the fault frequencies for each vendor stored in database 105. The vendor corresponding to the fault frequency ranges, in which the detected fault frequencies having the greatest amplitude sums fall, is the most likely vendor for the bearing exhibiting fault frequency vibrations. System 100 then compares 212 the sums of the amplitudes of the vibrations falling within the corresponding fault frequency ranges, for the previously identified vendor, for each potential bearing type or location, to the sums of the measured and recorded amplitudes corresponding to the respective bearing types/locations, to identify the likely location of the failing bearing.

System 100 compares 206 detected and calculated vibration amplitudes and/or frequencies against the vendor fault frequencies sequentially. Specifically, and making reference to exemplary table 400 of FIG. 4, system 100 first compares 206 the fault frequency ranges for Vendor 1 with the spectrum calculated 204 from the data acquired by sensor 102. After comparing the fault frequency ranges for Vendor 1 against the calculated spectrum, system 100 then compares the fault frequency ranges for Vendor 2 against the calculated spectrum, and so on for each potential vendor.

To facilitate comparison 206, system 100 defines a set of fault frequency ranges corresponding to the fault frequencies for each bearing for each Vendor. System 100 uses the fault frequency ranges to identify actual detected fault frequencies, by overlaying the fault frequency ranges over the actual detected fault frequencies. As described herein, vendors' predefined theoretical fault frequency values are defined to two or three significant figures. However, actual detected fault frequencies for a bearing may not precisely correlate to the predefined theoretical fault frequencies for that bearing. Accordingly, for each vibration mode for each bearing, a "normal" frequency range is defined, such that a detected frequency that is found within that normal frequency range is deemed to correspond to the predefined fault frequency for that bearing and mode. The width of the normal frequency range is referred to as a "bin." As used herein, a "bin" is defined as having a width equal to a spectral resolution of system 100. As used herein, "spectral resolution" is defined as the inverse of the length of a data sample measured in units of time as used by system 100. Accordingly, a "bin" is measured in units of frequency. In general, the larger a data sample is (e.g., in terms of elapsed time), the smaller the corresponding bin width is. In general, it is desirable to have larger sample sizes as the use of larger sample sizes results in greater precision, although larger sample sizes requires system 100 to have greater processor capacity for handling data, due to the larger amounts of data that are acquired during the sampling process.

As described herein, a normal fault frequency range is one bin wide, located at a predefined fault frequency. However, in practice, the actual fault frequencies may depart from the theoretical predefined values. To accommodate deviations from theoretical predefined values, one or more of the normal fault frequency ranges may be extended upwardly and/or downwardly from the normal fault frequency range. The amount of the extension is measured in bins, as defined herein. In one embodiment, the extension amounts are equal, or substantially equal (that is, differing by no more than one bin). In alternative embodiments, system 100 is configured to define fault frequency ranges that are not symmetrically distributed with respect to their corresponding predefined fault frequencies. In such alternative embodiments, the amounts of the expansion are substantially unequal, for example, differing by more than one bin.

For example, a phenomenon called "slip" can cause some actual fault frequencies to occur below the theoretical frequencies. As used herein, "slip" refers to the relative movement of ball bearings sliding relative to their races, or similar phenomena. In order to accommodate slip associated with actual detected fault frequencies, system 100 adjusts the predefined fault frequency ranges to add bins above or below the theoretical fault frequency, and the number of bins will depend on the spectral resolution of system 100.

In order to determine the final amplitude score (step 208), system 100 sums the maximum amplitudes of all vibrations detected within all of the assigned bins of the fault frequency range for the vibration mode being analyzed. System 100 then sums the maximum amplitudes for all vibrations detected within each of the fault frequency ranges defined for the remaining fault frequency modes for the bearing in question, to obtain the final amplitude score for that bearing.

Figure 3:
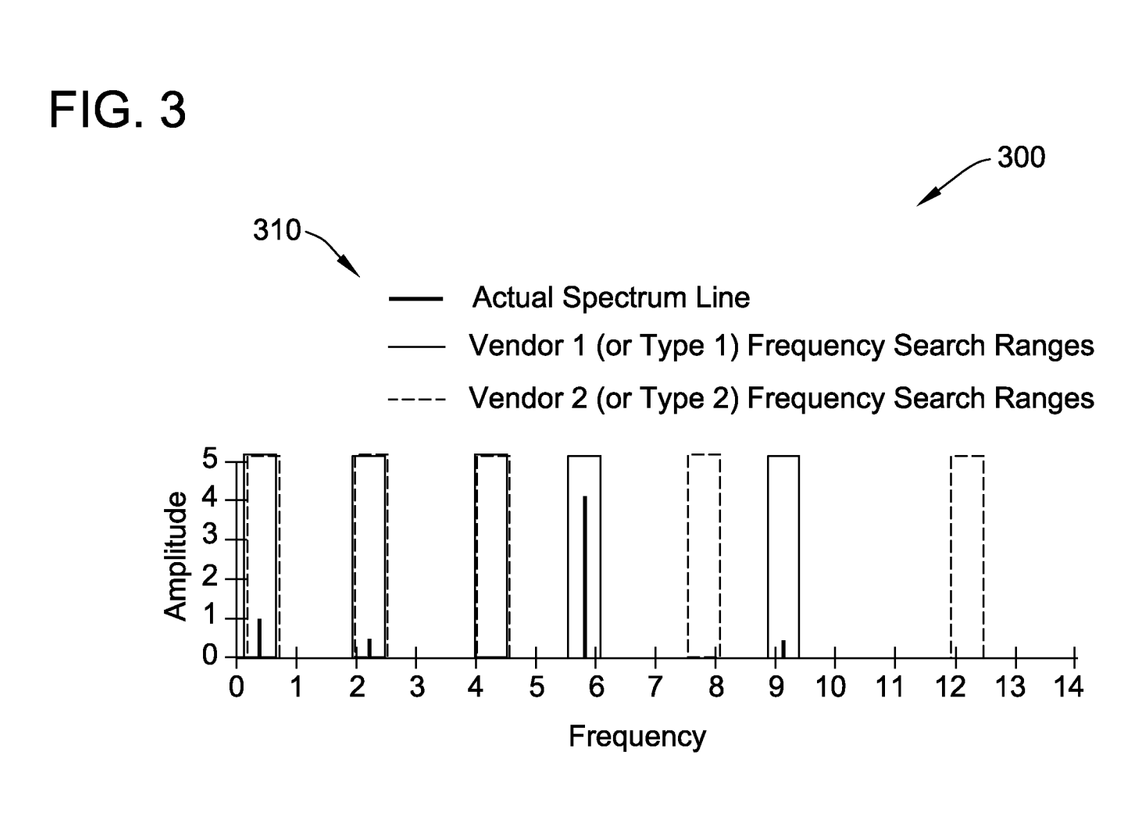
FIG. 3 is a chart illustrating exemplary frequency ranges for a plurality of vendors' components plotted against hypothetical calculated vibration frequency spectrum lines for a hypothetical in-service machine.

FIG. 3 is a chart 300 illustrating exemplary fault frequency ranges for different vendors' components, such as bearings, plotted against exemplary hypothetical calculated spectrum lines associated with sensed vibrations from an in-service machine. Legend 310 identifies the line types representing the spectrum lines and frequency ranges. FIG. 3 illustrates hypothetical fault frequency ranges for two separate vendors (Vendor 1 and Vendor 2), or fault frequency ranges for two separate bearing types or locations (Type 1 and Type 2). For example, vibration amplitudes for a hypothetical machine are recorded at approximately 0.5, 2.25, 5.75 and 9.2 frequency units. Vendor 1 bearings have fault frequency ranges designated in the ranges marked by thin solid lines, while Vendor 2 bearings have fault frequency ranges designated in the frequency ranges marked by dashed lines. As indicated in FIG. 3, Vendor 1 has a score of 6.0, while Vendor 2 has a score of 1.5. Accordingly, system 100 indicates that the vibration amplitudes correspond more closely to Vendor 1 bearings.

To compare 206 detected fault frequencies against fault frequency ranges associated with stored vendor fault frequencies, system 100 overlays the fault frequency ranges based on the predefined fault frequencies for a first vendor (Type 1 in FIG. 3) over the detected fault frequencies. System 100 identifies the maximum vibration amplitude corresponding to each fault frequency "found" in any of the Type 1 fault frequency ranges. System 100 then calculates 208 the total of the maximum amplitudes of the detected fault frequencies identified in the fault frequency ranges corresponding to Type 1. Specifically, system 100, using the data previously acquired, determines the sum of the amplitudes sampled within the frequency ranges corresponding to the five vibration modes corresponding to Vendor 1. After system 100 has calculated 208 the sum of the maximum amplitudes corresponding to the first vendor (Type 1), system 100 repeats 210 steps 204-208 for the next potential vendor (Type 2) for machine 101, until all potential vendors have been exhausted. Once the totals of the maximum vibration amplitudes corresponding to all the potential vendors for machine 101 have been calculated, system 100 identifies the vendor corresponding to the highest calculated total as being the most likely source of the bearing exhibiting fault frequencies as detected by system 100.

System 100 also stores in database 105 data corresponding to fault frequencies and calculated fault frequency ranges for bearings from a specific vendor, according to location or type. Specifically, for a particular machine, a bearing used in a first location in a machine is likely to have a different design, or type, than a bearing from that same vendor to be used in a second location. As used herein, "location fault frequency ranges" refers to a set of fault frequency ranges, as described above, that correspond to a particular bearing location. Accordingly, after system 100 has identified the identity of the likely vendor to whom the detected fault vibrations are attributable, system 100 compares 212 a set of location fault frequency ranges, for Type 1 bearings, for example, to detected vibration frequencies by overlaying the location fault frequency ranges onto the plot of the actual fault vibration amplitudes corresponding to machine 1, as shown in FIG. 3. The maximum amplitudes for fault frequencies "found" in those ranges are totaled. System 100 then overlays the location fault frequency ranges for Type 2 bearings, and calculates the sum of the maximum amplitudes for fault frequencies found in those fault frequency ranges. System 100 repeats step 212 for each potential bearing type corresponding to the previously-identified vendor. System 100 identifies the largest vibration amplitude sum across the several vibration frequency modes as the likely bearing type/location evidencing the fault behavior.

In an alternative embodiment, system 100 retains the calculations regarding the sums of the maximum amplitudes, so that the second most likely vendor, or second most likely bearing location are provided, in the event that the most likely vendor or most likely bearing location are found not to correspond to the actual bearing exhibiting fault frequency behavior.

In an alternative exemplary embodiment, rather than calculating spectral amplitudes, system 100 performs the steps of method 200 using as the calculated feature of the detected waveforms, the sum of all of the squared spectral peak values. As another alternative, system 100 uses as the spectral amplitude of the detected waveforms, the sum of all the sensed vibration energies, typically represented through a root mean square ("RMS") calculation. As another alternative, instead of finding the maximum amplitude in each fault frequency range, system 100 calculates the sum of all bins in each fault frequency range and uses that value instead of the maximum amplitude value.

In contrast to known methods for identifying bearings exhibiting fault frequencies, the systems and methods described herein enable the locations of a source of detected vibration fault frequencies in a machine incorporating consumable components, such as rotational elements, to be easily identified even when bearings from multiple vendors are included in the machine. The systems and methods described herein provide an advantage in that an owner/operator of a machine does not need to have possession of information directly identifying by location, the vendor and make or model of each bearing in the machine, in order to enable an accurate identification of the likely source (location) of a detected fault frequency to enable correct replacement components to be identified and obtained. Rather, unlike existing system, the systems described herein may be applied to any machinery incorporating vibrations, and not only those involving rotating machinery, so long as the machinery is capable of exhibiting characteristic behavior expressible as defined frequencies. Likewise, the systems described herein may be applied to machines exhibiting phenomena other than vibration, such as acoustic or light emissions, which likewise are expressible in terms of frequencies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in identifying a fault frequency set associated with one or more bearings of a turbine system, comprising:
   a processor;
   a database coupled to the processor and configured to store successive sets of vendor fault frequency ranges; and
   a control system configured to:
   collect vibrational data from a vibrational sensor coupled to a shaft or mounting structure of the turbine system, wherein the vibrational data comprises an operating characteristic associated with a bearing of the turbine system;
   calculate spectra corresponding to the detected operating characteristic using the vibrational data from the vibrational sensor;
   compare the calculated spectra to the successive sets of vendor fault frequency ranges stored in the database, wherein the successive sets of vendor fault frequency ranges are associated with vendor fault frequencies of a plurality of bearings originating from each of a plurality of vendors, and wherein the successive sets of vendor fault frequency ranges comprise sets of fault frequency ranges defined by a specification of each of the plurality of vendors;
   calculate a sum of maximum amplitudes for each of a plurality of bins, wherein each bin of the plurality of bins corresponds to a frequency range of the spectra;
   determine which sum of maximum amplitudes of the plurality bin has a highest absolute value;
   identify at least one fault frequency set in the successive sets of vendor fault frequency ranges associated with the turbine system as corresponding to the bin corresponding to the sum of maximum amplitudes having the highest absolute value;
   store data corresponding to location fault frequency sets to the database, wherein each location fault frequency set is associated with a corresponding vendor and a corresponding location of a respective bearing on or within the turbine system; and
   generate an indication of a vendor and a location of one of the plurality of bearings on or within the turbine system based on the data corresponding to location fault frequency sets to facilitate a correct replacement component to be identified and obtained to replace the one of the plurality of bearings.

2. The system of claim 1, wherein the control system is configured to identify as a probable vendor associated with the detected operating characteristic the vendor associated with the sum having the highest absolute value.

3. The system of claim 1, wherein the collected vibrational data comprising the detected operating characteristic corresponds to vibration fault frequencies associated with at least bearing of the turbine system.

4. The system of claim 1, wherein the control system is configured to:
   generate and compare a plurality of sums; and
   identify as a probable location within the turbine system of the source of the detected operating characteristic the location associated with the generated sum having the highest value.

5. The system of claim 1, wherein the vendor fault frequency ranges comprise normal fault frequency ranges associated with bearings associated with specific vendors, wherein each fault frequency range is expanded, at upper and lower extremes thereof, by predefined range expansion values.

6. The system of claim 5, wherein the range expansion values at the upper and lower extremes of the normal fault frequency ranges are equal.

7. The system of claim 5, wherein the range expansion values at the upper and lower extremes of at least one normal fault frequency range are substantially unequal.

8. The system in accordance with claim 1, wherein the location fault frequency sets comprise:
   normal location fault frequencies associated with bearings associated with a single vendor and associated with specific locations within the turbine system.

9. A method for use in identifying a fault frequency set associated with one or more bearings of a turbine system, comprising:
   collecting, via a control system, vibrational data from a vibrational sensor coupled to a shaft or mounting structure of the turbine system, wherein the vibrational data comprises an operating characteristic associated with a bearing of the turbine system;
   calculating spectra corresponding to the detected operating characteristic using the vibrational data from the vibrational sensor;
   comparing the calculated spectra to successive sets of vendor fault frequency ranges stored in a database, wherein the successive sets of vendor fault frequency ranges are associated with vendor fault frequencies of a plurality of bearings originating from each of a plurality of vendors, and wherein the successive sets of vendor fault frequency ranges comprise sets of fault frequency ranges defined by a specification of each of the plurality of vendors;
   calculating a sum of maximum amplitudes for each of a plurality of bins wherein each bin of the plurality of bins corresponds to a frequency range of the spectra;
   determining which sum of maximum amplitudes of the plurality bin has a highest absolute value;
   identifying at least one fault frequency set in the successive sets of vendor fault frequency ranges associated with the turbine system as corresponding to the bin corresponding to the sum of maximum amplitudes having the highest absolute value;
   storing data corresponding to location fault frequency sets to the database, wherein each location fault frequency set is associated with a corresponding vendor and a corresponding location of a respective bearing on or within the turbine system; and
   generating an indication of a vendor and a location of one of the plurality of bearings on or within the turbine system based on the data corresponding to location fault frequency sets to facilitate a correct replacement component to be identified and obtained to replace the one of the plurality of bearings.

10. The method of claim 9, comprising identifying as a probable vendor associated with the detected characteristic the vendor associated with the sum having the highest absolute value.

11. The method of claim 9, wherein the collected vibrational data comprising the detected operating characteristic corresponds to vibration fault frequencies associated with at least one bearing in the turbine system.

12. The method of claim 9, comprising:
generating and comparing a plurality of sums; and
identifying as a probable location within the turbine system of the source of the detected operating characteristic the location associated with the generated sum having the highest value.

13. The method of claim 9, wherein the vendor fault frequency ranges comprise normal fault frequency ranges associated with bearings associated with specific vendors, wherein each fault frequency range is expanded, at upper and lower extremes thereof, by predefined range expansion values.

14. The method of claim 13, wherein the range expansion values at the upper and lower extremes of the normal fault frequency ranges are equal.

15. The method of claim 13, wherein the range expansion values at the upper and lower extremes of at least one normal fault frequency range are substantially unequal.

16. The method of claim 9, wherein the location fault frequency sets comprise normal location fault frequencies associated with consumable components associated with a single vendor and associated with specific locations within the turbine system.

\* \* \* \* \*